US008348281B2

(12) United States Patent
Yoshida et al.

(10) Patent No.: US 8,348,281 B2
(45) Date of Patent: Jan. 8, 2013

(54) SEAL RING AND STERN TUBE SEALING DEVICE

(75) Inventors: Hisashi Yoshida, Toyama (JP); Motofumi Inaba, Toyama (JP); Minoru Takayasu, Toyama (JP)

(73) Assignee: Wartsila Japan Ltd. (JP)

( * ) Notice: Subject to any disclaimer, the term of this patent is extended or adjusted under 35 U.S.C. 154(b) by 0 days.

(21) Appl. No.: 13/016,489

(22) Filed: Jan. 28, 2011

(65) Prior Publication Data

US 2011/0304102 A1  Dec. 15, 2011

Related U.S. Application Data

(63) Continuation of application No. PCT/JP2010/059880, filed on Jun. 10, 2010.

(51) Int. Cl.
F16J 15/32 (2006.01)
(52) U.S. Cl. .................. 277/562; 277/560; 277/572
(58) Field of Classification Search .................. 277/551, 277/560, 561, 564, 572
See application file for complete search history.

(56) References Cited

U.S. PATENT DOCUMENTS

| 3,902,726 | A | * | 9/1975 | Hisada | 277/563 |
| 4,344,631 | A | * | 8/1982 | Winn | 277/552 |
| 4,482,158 | A | * | 11/1984 | Ishitani et al. | 277/353 |
| 4,632,403 | A | * | 12/1986 | Ishitani et al. | 277/563 |
| 4,964,647 | A | * | 10/1990 | Stephan | 277/560 |
| 5,411,273 | A | * | 5/1995 | Pietsch et al. | 277/309 |
| 5,683,278 | A | * | 11/1997 | Pietsch et al. | 440/112 |
| 6,481,720 | B1 | * | 11/2002 | Yoshida et al. | 277/400 |
| 7,798,496 | B2 | * | 9/2010 | Dietle et al. | 277/551 |
| 2003/0075872 | A1 | * | 4/2003 | Ikeda | 277/560 |

FOREIGN PATENT DOCUMENTS

| JP | 2-98092 U | 8/1990 |
| JP | 6-6194 U | 1/1994 |
| JP | 6323443 A | 11/1994 |
| JP | 2000-110946 A | 4/2000 |
| JP | 2000-238694 A | 9/2000 |

(Continued)

OTHER PUBLICATIONS

International Search Report issued in corresponding international application PCT/JP2010/059880, having a mailing date of Jul. 27, 2010.

(Continued)

*Primary Examiner* — Vishal Patel
*Assistant Examiner* — Nicholas L Foster
(74) *Attorney, Agent, or Firm* — Rossi, Kimms & McDowell LLP

(57) ABSTRACT

A stern tube sealing assembly and a seal ring thereof has a key part having an inverted V-shape, a front step part on the front side, and a back step part on the back side thereof. The seal ring width in a propulsion-shaft axis direction becomes thinner in the transition area from the key part toward a heel part. The inner diameter of the key part at the back step part is greater than that of the key part at the front step part. The ring has a lip part having a V-shaped lip tip protruding inwardly in the radial direction and a spring groove having a semicircular cross-section. The center of the spring groove is nearer to the inboard side than the lip tip, by an offset in the axis direction, the offset being within approximately 10% of the orthogonal projection length of the width of the lip back.

7 Claims, 7 Drawing Sheets

FOREIGN PATENT DOCUMENTS

JP    2002-276817 A    9/2002

OTHER PUBLICATIONS

Office Action cited in corresponding Korean application No. 7002269, issued Aug. 22, 2011.

Office Action cited in corresponding Korean application No. 7002269, issued May 2, 2011.
Korean Office Action for corresponding KR 2011-7002269, dated May 2, 2011. English translation provided.
Korean Office Action for corresponding KR2011-7002269, dated Aug. 22, 2011. English translation provided.

* cited by examiner

FIG. 4

| | TAPER ANGLE (deg.) IN FREE CONDITION | | TAPER ANGLE (deg.) WHEN LINER IS INSTALLED | LEAKAGE | SLIDING/CONTACTING SURFACE CONDITION |
|---|---|---|---|---|---|
| | FRONT FACE SIDE ANGLE ($\beta$) | BACK FACE SIDE ANGLE ($\alpha$) | BACK FACE SIDE ANGLE ($\alpha'$) | | |
| 1st EMBODIMENT | $45 \leq \beta \leq 55$ | $25 \leq \alpha \leq 30$ | $15 \leq \alpha' \leq 20$ | SMALL | UNCHANGED |
| COMPARISON Ex. 1 | $45 \leq \beta \leq 55$ | $20 \leq \alpha < 25$ | $10 \leq \alpha' \leq 18$ | SMALL | WORN |
| COMPARISON Ex. 2 | $55 < \beta \leq 65$ | $25 \leq \alpha \leq 30$ | $15 \leq \alpha' \leq 20$ | MEDIUM | UNCHANGED |
| COMPARISON Ex. 3 | $55 < \beta \leq 65$ | $20 \leq \alpha < 25$ | $10 \leq \alpha' \leq 18$ | MEDIUM | WORN |

FIG. 5A

| | SEAL RING PROFILE (IN FREE CONDITION) | | ITEMS | | | | | |
|---|---|---|---|---|---|---|---|---|
| | AXIS DIRECTION LENGTH OF LIP BACK FACE WIDTH (mm) | SPRING OFFSET (mm) | WITH/ WITHOUT BACK-UP MEMBER | SLIDING/ CONTACTING SURFACE TEMPERATURE (°C) | LEAKAGE FROM BACK FACE SIDE TO FRONT FACE SIDE | CONTACT WIDTH (mm) | SLIDING/CONTACTING SURFACE CONDITION | LIP PART DEFORMATION | $H^3/L^4$ (1/mm) |
| 1st EMBODIMENT | 9 | 0.5 | WITH | 64 | SMALL | 2 | UNCHANGED | SMALL | / |
| 2nd EMBODIMENT | 9 | 1.0 | WITH | 66 | SMALL | 3 | UNCHANGED | SMALL | $14 \times 10^{-4}$ |
| COMPARISON Ex. 4 | 9 | 1.0 | WITHOUT | 70 | SMALL | 4.5 | UNCHANGED | MEDIUM | $4.6 \times 10^{-4}$ |
| COMPARISON Ex. 5 | 9 | 2.0 | WITH | 67 | MEDIUM | 4 | BLISTER | LARGE | / |
| COMPARISON Ex. 6 | 9 | 2.0 | WITHOUT | 75 | SMALL | 6.5 | WORN, BLISTER | LARGE | / |

FIG. 5B

TEST CONDITIONS (ROTATION TEST CONDITIONS)
ROTATION SPEED: 3.8m/s
DIFFERENTIAL PRESSURE: 0.15MPa
ENVIRONMENT: FRONT FACE SIDE: FRESH WATER
/ BACK FACE SIDE: OIL

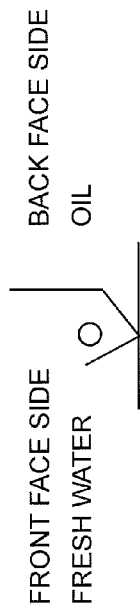

FRONT FACE SIDE          BACK FACE SIDE
FRESH WATER              OIL

SEAL RING AND STERN TUBE SEALING DEVICE

CROSS REFERENCE TO RELATED APPLICATION

This is a continuation of International Application PCT/JP2010/059880 having an international filing date of 10 Jun. 2010. The disclosure of the PCT application in its entirety, including the drawings, claims, and the specification thereof, is incorporated herein by reference.

BACKGROUND OF THE INVENTION

1. Field of the Invention

The present invention relates to a seal ring provided between a ship propulsion shaft and a casing thereof; whereby, the propulsion shaft penetrates the inner space of the casing that is provided on the outboard side of the ship stern tube, the seal ring being used for preventing sea water from entering the inner side of the ship. The present invention also relates to a stern tube sealing device provided with the seal ring.

It is hereby noted that the term "invention" or "present invention" in this specification means the aspect, the mode or the embodiment disclosed by this specification.

2. Background of the Invention

A seal ring made of rubber or elastomer has been conventionally used in the stern tube sealing device. For instance, Patent Reference 1 (JP2000-238694) discloses a stern tube sealing device as shown in FIG. 7; the device is provided with lip shaped seal rings 04, 05 and 06 made of elastic material, the lip shaped seal rings keeping contact with a liner 03 fitted to a propulsion shaft (a propeller shaft) 02 penetrating a stern tube 01 so that each seal ring is sandwiched by a housing member 07 and an adjacent housing member 07; the first seal ring 04 on the rearmost side of the ship and the second seal ring 05 next to the first seal ring 04 form a first stern tube annular-space 08, and the second seal ring 05 and the third seal ring 06 form a second stern tube annular-space 09; thus, the stern tube sealing device 010 prevents sea water and foreign matters from entering the inside of the ship, as well as, prevents lubricating oil on the inside of the ship from leaking outboard.

The cross-section profile regarding the seal rings 04, 05 and 06 forms the shape such as shown in FIG. 8.

[References]
[Patent References]
  Patent Reference 1: JP2000-238694

SUMMARY OF THE INVENTION

Subjects to be Solved

The seal ring used in the stern tube sealing device is configured with:
  an outer periphery seal-part fitted in an annular groove formed on the inner periphery surface of the casing that is provided on the outboard side of the ship stern tube, and
  a lip seal-part keeping tight contact with the outer periphery surface of the propeller shaft or a liner fitted at the outer periphery of the propeller shaft.

The outer periphery seal-part is fitted in the annular groove formed on the inner periphery surface of the casing, so that a tight fit between the outer periphery seal-part and the annular groove is achieved.

Thus, there happens a possibility that the deformation under torsion or gripping regarding the outer periphery seal-part is caused, in fitting the outer periphery seal-part in the annular groove; further, there happens a possibility that the contact stress in the lip seal-part changes in response to the deformation of the outer periphery seal-part, the deformation being caused by the temperature change; therefore, the sealing performance of the seal ring may be deteriorated.

Further, the seal ring is provided with an arm part for supporting the lip seal-part that keeps tight contact with the outer periphery surface of the propeller shaft or the liner. When the stiffness of this arm part is not adequate, then the contact pressure between the lip seal-part and the outer periphery surface of the propeller shaft or the liner is reduced below an appropriate level; in this case, the sliding surface (the contact surface) of the lip seal-part spreads so that the contact pressure distribution becomes flat; accordingly, an abnormal wear regarding the sliding surface may be caused in an early stage. Further, there has been an apprehension that the sliding friction heat due to the abnormal wear causes the softening of the solid state properties regarding the rubber material, as well as, causes the deformation thereof; namely, the seal ring rubber material may become spongy, and air bubbles (blisters) or cracks may occur inside of the material. Therefore, various contrivances have been conventionally made regarding the cross-section profile of the lip seal-part or the stiffness of the arm part for supporting the lip seal-part.

As shown in FIG. 8, according to the cross-section profile of the seal ring disclosed by Patent Reference 1, microscopic unevenness (a plurality of projections and depressions) 011 is provided on the sliding surface 012 of the liner 03 fitted at the outer periphery of the propeller shaft 02, so that the water of a lower pressure in a first stern tube annular-space 08 is forcedly delivered to the outboard side of a higher pressure during the propeller rotation; thereby, a seal ring 04 keeps contact with the liner 03 of the propeller shaft 02, at the sliding surface 012, and microscopic unevenness (a plurality of projections and depressions) 011 actively feeds the water outboard during the propeller rotation.

Thus, the following points are out of the scope of the disclosure by Patent Reference 1:
  a cross-section profile of the seal ring with which the outer periphery seal-part of the seal ring can be stably fitted in the groove formed on the inner periphery surface of the casing; or,
  a cross-section profile of the seal ring with which the outer periphery seal-part of the seal ring can be easily fitted in the groove formed on the inner periphery surface of the casing.
  Further, the disclosure does not cover how to maintain the contact pressure (stress) of the lip seal-part in an appropriate condition, how to evade the leakage through the sliding surface between the lip seal-part and the propeller shaft, how to evade the early stage abnormal-wear regarding the lip seal-part, and how to enhance the sealing performance over the above-described how-to-approaches.

In view of the unsolved difficulties in the conventional technology as described above, the present invention aims at providing the seal ring and the stern tube device with the seal ring; whereby, the contact pressure (stress) of the lip seal-part is appropriately established so that the leakage as well as the abnormal-wear in the early stage can be evaded, the durability of the seal ring as well as the sealing performance with the durability can be enhanced, the outer periphery seal-part of the seal ring can be easily fitted in the groove of the casing, and the contact pressure (stress) of the lip seal-part can be stabilized.

Means to Solve the Subjects

In order to overcome the difficulties as described, the first invention (a first aspect of the present invention) provides a seal ring provided between a casing member provided on the outboard side of the stern tube and a ship propulsion shaft penetrates the inner space of the casing member so that the seal ring prevents seawater from entering the inboard side, the seal ring including, but not limited to, in view of the cross-section of the seal ring in a plane including the axis of the ship propulsion shaft:

- a key part fitted in an annular groove formed in the casing;
- a heel part extended from the key part toward the center axis of the ship propulsion shaft, in the radial direction;
- an arm part extended from an inner end part of the heel part toward the front surface side of the seal ring with a predetermined taper angle, the inner periphery side of the arm part being supported by a back-up member formed on the side of the casing member;
- a lip part formed at a front end part of the arm part, the lip part keeping tight contact, at a contacting point, with the outer periphery surface of a liner that is fitted around or on the outer periphery surface of the ship propulsion shaft, wherein an apex part of the key part is formed so that the cross-section profile regarding the apex part forms a reversed V-shape toward the outside in the radial direction; thereby, the summit of the reversed V-shape is formed in a plane that equally divides the width of the key part in the longitudinal direction along the ship propulsion shaft;

a step part on the front surface side of the key part and a step part on the back surface side of the key part are provided so that the width of the seal ring in the axis direction of the ship propulsion shaft becomes thinner in the transition area from the key part toward the heel part; thereby, the inner diameter of the key part at the step part on the back surface side of the key part is greater than the inner diameter of the key part at the step part on the front surface side of the key part;

a lip tip of the lip part forms a V-shape protruding inward in the radial direction and a spring groove having a semi-circular cross-section in which a ringed spring thrusting the lip part toward the ship propulsion shaft is formed in the lip part; thereby, the center regarding the spring groove is arranged so as to be nearer to the inboard side than the position of the lip tip, by an offset in the propeller shaft axis direction, the offset being within approximately 10% of the orthogonal projection length of the lip back width, the orthogonal projection being a projection on to the axis direction of the ship propulsion shaft.

According to the first invention as described above, the apex part of the key part is formed so that the cross-section profile regarding the apex part forms a reversed V-shape toward the outside in the radial direction, the summit of the reversed V-shape being formed in a plane that equally divides the width of the key part in the longitudinal direction along the ship propulsion shaft; a step part on the front surface side of the key part and a step part on the back surface side of the key part are provided so that the width of the seal ring in the axis direction of the ship propulsion shaft becomes thinner in the transition area from the key part toward the heel part, the inner diameter of the key part at the step part on the back surface side of the key part being greater than the inner diameter of the key part at the step part on the front surface side of the key part. Thus, the fitting performance regarding the key part of the seal ring fitted in the annular groove can be enhanced; and, the key part is prevented from failing to be smoothly fitted into the annular groove, from being gripped and deforming, and from causing deformation of the contact surface on the side of the lip part. In this way, the possibility that the sealing performance is hindered due to the change of the contact stress (pressure) of the lip part can be evaded.

Thanks to the lower height of the key part on the back side, the seal ring can be easily thrust into the annular groove in the casing; thereby, the seal ring installation is performed from the front side. Accordingly, the easy fitting can be achieved. And, when a ship is put into a dock, the seal ring can be easily replaced by new one, without pulling out the propeller shaft, under the condition that the propeller 3 and the liner 15 are not dismantled.

Further, according to the first invention, a lip tip of the lip part forms a V-shape protruding inward in the radial direction and a spring groove having a semicircular cross-section in which a ringed spring is formed in the lip part; thereby, the center regarding the spring groove is arranged so as to be nearer to the inboard side than the position of the lip tip, by an offset in the propeller shaft axis direction, the offset being within approximately 10% of the orthogonal projection length of the lip back width. Further, when the key part is fitted in the annular groove and the lip part keeps tight contact with the outer periphery of the liner that is fitted around or on the ship propulsion shaft, the offset amount becomes approximately 20% of the orthogonal projection length of the lip back width, the orthogonal projection being a projection on to the axis direction of the ship propulsion shaft. With this offset amount, the ringed spring is positioned; and the contact stress in the neighborhood of the lip tip is enhanced; the sealing performance of the lip part can be enhanced. Further, thanks to the enhanced contact pressure in the neighborhood of the lip tip, the flat (and wide) contact on the lip back side can be hard to appear; thus, the abnormal wear can be prevented from occurring. Moreover, the contact stress in the lip part is maintained so that neither leakage nor abnormal wear can be caused; thus, durability can be enhanced without spoiling the sealing performance.

A preferable embodiment of the first invention is the seal ring, whereby a lip front face angle $\beta$ that is a taper angle which the lip front face forms with the propeller shaft axis direction toward the lip front side and a lip back face angle $\alpha$ that is a taper angle which the lip back face forms with the propeller shaft axis direction toward the lip front side, wherein the angles $\alpha$ and $\beta$ are established so that $\beta > \alpha$, $\beta = 45$ to $55°$ and $\alpha = 25$ to $30°$.

When the lip back face angle $\alpha$ exceeds the above-described range of 25 to $30°$ and the lip front face angle $\beta$ exceeds the above-described range of 45 to $55°$, the angle of the lip tip becomes a sharp angle; the contacting surface width around the lip tip becomes in shortage in a case of the ships in which vibration levels are high; and, the seawater leakage from the front surface side to the back surface side as well as the lubricating oil leakage from the back surface side to the front surface side is inclined to occur. Further, when the lip back face angle $\alpha$ becomes lower than the above-described range of 25 to $30°$ and the lip front face angle $\beta$ becomes lower than the above-described range of 45 to $55°$, the angle of the lip tip becomes an obtuse (not-sharp) angle; the contacting surface width around the lip tip becomes greater, and satisfactory contact pressure cannot be achieved because of the excessive contact area. Thus, sealing performance is deteriorated and early abnormal wear is inclined to occur.

In this way, establishing the angle α and the angle β in each appropriate range can constrain potential abnormality that may appears on the contacting surface in the neighborhood of the lip tip; thus, durability can be enhanced without spoiling sealing performance. Establishing the lip back face angle α and the lip front face angle β as described, in particular, together with establishing the offset regarding the position of the ringed spring can make the contacting stress in the neighborhood of the lip tip appropriate, and sealing performance can be enhanced.

Another preferable embodiment of the first invention is the seal ring, whereby an arm thickness H is thickness of the arm part at a contacting point regarding the arm part and the back-up member and an arm length L is a length along a taper angle direction from the contacting point to the lip tip, wherein the arm thickness H and the arm length L are established so that a relation $H^3/L^4=(10 \text{ to } 30) \times 10^{-4}$ (in mm$^{-1}$) holds.

Establishing the width H and the length L so that the relation $H^3/L^4=(10 \text{ to } 30) \times 10^{44}$ (in mm$^{-1}$) holds means establishing the stiffness from the arm part to the lip part with regard to the parameters.

A part of the seal ring on the front side from the contacting point forms a cantilever beam for which the cantilever deflection formula can be used; the bending deflection V regarding the lip tip is computed by use of the following formula (1). Hereby, an appropriate stiffness of the arm part and the lip part are evaluated with regard to the parameter $H^3/L^4$ that appears in the formula (1).

The formula (1) is expressed as follows.

$$V=K_1(W L^4/E I)=K_2(W L^4/E H^3) \qquad (1),$$

where W is the pressure that works on the front face side of the seal ring, $K_1$ and $K_2$ are constants, and E is Young' modulus (regarding the used material such as fluororubber).

Based on the results of the tests, the relation $H^3/L^4=(10 \text{ to } 30) \times 10^{-4}$ (in mm$^{-1}$) is found. In other words, it is found that, so long as the length L and the height H is within a range that the formula (1) allows, an appropriate contacting state is maintained so that excessively wide contact (excessively flat contact) regarding the sliding surface of the lip seal part can be evaded; and, neither leakage nor abnormal wear can be caused. Thus, durability can be enhanced without spoiling sealing performance.

Another preferable embodiment of the first invention is the seal ring, whereby the stiffness of the arm part and the lip part is established so that the contacting surface width in the neighborhood of the lip tip becomes 2 to 3 mm, when the pressure on the front face side is higher than the pressure on the back face side, by 0.15 MPa, under a condition that the key part is set in the annular groove, the liner is installed, and the lip part keeps tight contact with the outer periphery of the liner that is fitted around or on the outer periphery surface of the ship propulsion shaft.

As described above, by establishing the contacting surface width, an appropriate contacting state is maintained so that excessively wide contact (excessively flat contact) regarding the sliding surface of the lip part can be evaded; and, neither leakage nor abnormal wear can be caused. Thus, durability can be enhanced without spoiling sealing performance. Incidentally, the above-described width 2 to 3 mm is based on the results of the confirmation tests in advance.

In the next place, the second invention (a second aspect of the present invention) provides a stern tube sealing device provided with a seal ring provided between a casing member provided on the outboard side of the stern tube and a ship propulsion shaft which penetrates the inner space of the casing member so that the seal ring prevents seawater from entering the inboard side, the seal ring including, but not limited to, in view of the cross-section of the seal ring in a plane including the axis of the ship propulsion shaft:

a key part fitted in an annular groove formed in the casing;

a heel part extended from the key part toward the center axis of the ship propulsion shaft, in the radial direction;

an arm part extended from an inner end part of the heel part toward the front surface side of the seal ring with a predetermined taper angle, the inner periphery side of the arm part being supported by a back-up member formed on the side of the casing member;

a lip part formed at a front end part of the arm part, the lip part keeping tight contact, at a contacting point, with the outer periphery surface of a liner that is fitted around or on the outer periphery surface of the ship propulsion shaft, wherein an apex part of the key part is formed so that the cross-section profile regarding the apex part forms a reversed V-shape toward the outside in the radial direction; thereby, the summit of the reversed V-shape is formed in a plane that equally divides the width of the key part in the longitudinal direction along the ship propulsion shaft;

a step part on the front surface side of the key part and a step part on the back surface side of the key part are provided so that the width of the seal ring in the axis direction of the ship propulsion shaft becomes thinner in the transition area from the key part toward the heel part; thereby, the inner diameter of the key part at the step part on the back surface side of the key part is greater than the inner diameter of the key part at the step part on the front surface side of the key part, the key part being fitted and thrust in the annular groove so that a space in the radial direction between the inner periphery of the step part on the back face side and the annular groove is formed;

a lip tip of the lip part forms a V-shape protruding inward in the radial direction and a spring groove having a semi-circular cross-section in which a ringed spring thrusting the lip part toward the ship propulsion shaft is formed in the lip part; thereby, the center regarding the spring groove is arranged so as to be nearer to the inboard side than the position of the lip tip, by an offset in the propeller shaft axis direction, the offset being within approximately 10% of the orthogonal projection length of the lip back width, the orthogonal projection being a projection on to the axis direction of the ship propulsion shaft.

According to the second invention as described above, a stern tube sealing device with the seal ring and the function/performance thereof as per the first invention can be provided.

A preferable embodiment of the second invention is the stern tube sealing device, whereby a lip front face angle β that is a taper angle which the lip front face forms with the propeller shaft axis direction toward the lip front side and a lip back face angle α that is a taper angle which the lip back face forms with the propeller shaft axis direction toward the lip front side, wherein the angles α and β are established so that β>α, β=45 to 55° and α=25 to 30°

Another preferable embodiment of the second invention is the stern tube sealing device, whereby an arm thickness H is thickness of the arm part at a contacting point regarding the arm part and the back-up member and an arm length L is a length along a taper angle direction from the contacting point to the lip tip, wherein the arm thickness H and the arm length L are established so that a relation $H^3/L^4=(10 \text{ to } 30)\times10^{-4}$ (in $mm^{-1}$) holds.

Another preferable embodiment of the second invention is the stern tube sealing device, whereby the stiffness of the arm part and the lip part is established so that the contacting surface width in the neighborhood of the lip tip becomes 2 to 3 mm, when the pressure on the front face side is higher than the pressure on the back face side, by 0.15 MPa, under a condition that the key part is set in the annular groove, the liner is installed and the lip part keeps tight contact with the outer periphery of the liner that is fitted around or on the outer periphery surface of the ship propulsion shaft.

With the configurations as described above, a stern tube sealing device with the seal ring as per the first invention can be provided Another preferable embodiment of the second invention is the stern tube sealing device, whereby a relief groove is formed near to each middle position in the radial direction on both the sides of the annular groove.

In this way, a relief groove is formed near to each middle position in the radial direction on both the sides of the annular groove in which the key part is fitted. Thanks to the relief grooves on both the sides, when the key part is thrust and fitted in the annular groove in the casing, a part of each side wall of the key part enters the relief groove; thus, the relief grooves play role of positioning/fixing function regarding the key part so that the movement of the key part toward the inner side is restrained after the key part is thrust and fitted in the annular groove. In this way, the position of the key part in the casing is locked under the fitted condition; and, stable positioning is achieved.

Effects of the Invention

According to the first invention, the fitting performance regarding the key part of the seal ring fitted in the annular groove can be enhanced; the deformation of the key part while the key part is fitted can be restrained; the deformation of the lip part due to the deformation of the key part is also restrained. As a result, in response to the deformation of the key part, the contact stress in the lip part changes so that reverse effects on the sealing performance can be evaded. Further, the seal ring can be easily thrust and fitted in the annular groove in the casing; and, the replacement regarding the seal rings can be performed on the outer periphery of the liner (or the propeller shaft) without pulling-out the propeller shaft.

Further, according to the first invention, the lip tip of the lip part forms a V-shape protruding inward in the radial direction and a spring groove having a semicircular cross-section in which a ringed spring thrusting the lip part toward the ship propulsion shaft is formed in the lip part; the center regarding the spring groove is arranged so as to be nearer to the inboard side than the position of the lip tip, by an offset in the propeller shaft axis direction, the offset being within approximately 10% of the orthogonal projection length of the lip back width. Thus, when the key part is fitted in the annular groove and the lip part keeps tight contact with the outer periphery of the liner that is fitted around or on the ship propulsion shaft, the offset amount becomes approximately 20% of the orthogonal projection length of the lip back width. With this offset amount, the ringed spring is positioned; and the contact stress in the neighborhood of the lip tip is enhanced; the sealing performance of the lip part can be enhanced. Further, thanks to the enhanced contact pressure in the neighborhood of the lip tip, the flat (and wide) contact on the lip back side can be hard to appear; thus, the abnormal wear can be prevented from occurring. Moreover, the contact stress in the lip part is maintained so that neither leakage nor abnormal wear can be caused; thus, durability can be enhanced without spoiling sealing performance.

According to the second invention as described above, a stern tube sealing device with the seal ring and the function/effect brought by the seal ring as per the first invention can be provided.

BRIEF DESCRIPTION OF THE DRAWINGS

The present invention will now be described in greater detail with reference to the preferred embodiments of the invention and the accompanying drawings, wherein:

FIG. 4 shows a table explaining the relationship between the lip front face taper angle and the lip back face taper angle at the tip point of the lip seal-part;

FIG. 5(A) shows a table explaining a result of a rotation test regarding the seal ring under a condition where seal rings are installed in the test device;

FIG. 5(B) explains the test conditions.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
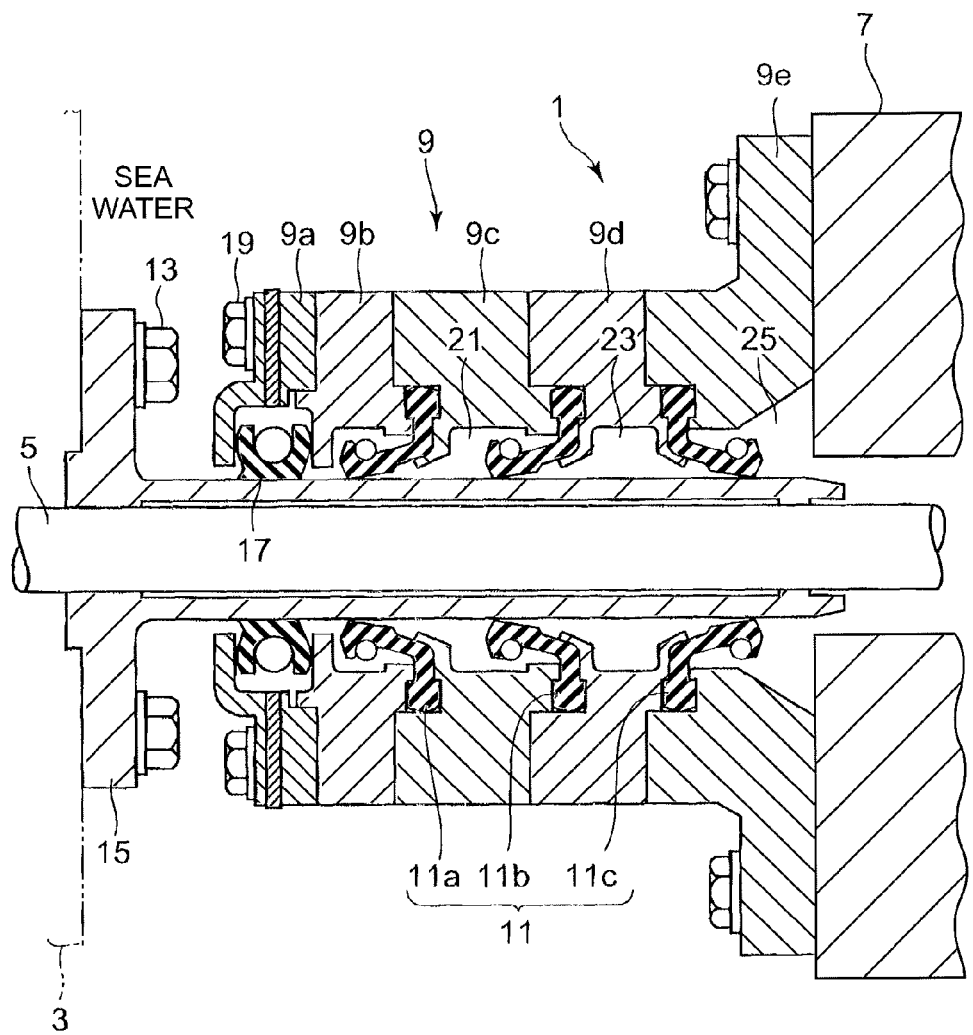
FIG. 1 shows a whole configuration of a stern tube sealing device as an example, the stern tube sealing device being provided with a seal ring according to an embodiment of the present invention.

With reference to FIG. 1, the whole configuration regarding the stern tube sealing device is now explained. As shown in FIG. 1, the stern tube sealing device 1 comprises (i.e. includes, but not limited to):

- a propeller shaft (a ship propulsion shaft) 5 that mounts a propeller 3 at the stern end side of the shaft,
- a casing 9 (comprising a plurality of casing members) that protrudes outboard from a stern tube 7, the propeller shaft 5 penetrating the inner space of the casing 9, and
- a plurality of seal rings 11 that seals the space between the inner periphery side of the casing 9 and the outer periphery side of the propeller shaft 5.
- a liner 15 of the propeller shaft 5 is fastened to the propeller 3 by use of bolts 13; the trunk part of the liner 15 surrounds the outer periphery of the propeller shaft 5, and the liner 15 rotates together with the propeller shaft 5. A lip seal-part corresponding to each seal ring of three seal rings 11a, 11b and 11c forming a lip shape keep contact with the outer periphery surface of the trunk part of the liner; and, the surface of the trunk part rotationally slides on each of the lip seal-parts. In addition, a fishing net inclusion prevention ring 17 is provide at the rearmost side of the casing so as to prevent foreign matters such as fishing nets from entering the inboard side.

The casing 9 comprising a plurality of casing members 9a, 9b, . . . , and 9e that are arranged in a stacked condition, and are fastened to the stern tube 7, the casing members 9a, 9b, . . . , and 9e forming an integrated part; mutually adjacent two members out of the casing members 9b, 9c, . . . , and 9e sandwich the each of the seal rings 11a, 11b and 11c so as to keep hold of the seal rings. The tip (lip tip) of the lip seal-part of the first seal ring 11a as well as the second seal ring 11a is directed toward the sea water side so as to prevent sea water from entering the inboard side; incidentally, the first seal ring 11a is arranged at the most stern side, and the second seal ring 11b is arranged next to the first seal ring 11a. On the other hand, the tip (lip tip) of the lip seal-part of the third seal ring 11c that is arranged nearest to the inboard side is directed toward the inboard side so as to prevent lubricating oil on the inboard side from leaking toward the outboard side.

Further, the first seal ring 11a and the second seal ring 11b form a first stern tube annular-space 21; the second seal ring 11b and the third seal ring 11c form a second stern tube annular-space 23; a third stern tube annular-space is formed on the stern tube 7 side of the third seal ring 11c; and, each annular-space 21, 23 or 25 communicates with a oil drain tank (not shown). Further, each annular-space 21, 23 or 25 is oil-tightly filled with oil in advance before the ship is put into service.

The seal rings 11a, 11b and 11c are made of elastic material such as rubber or elastomer; for example, fluororubber (e.g. Du Pont's product under a brand name "Viton") having superior water-resistance and oil-resistance properties or nitrile-butadiene rubber (NBR) forms the rubber material.

Figure 2:
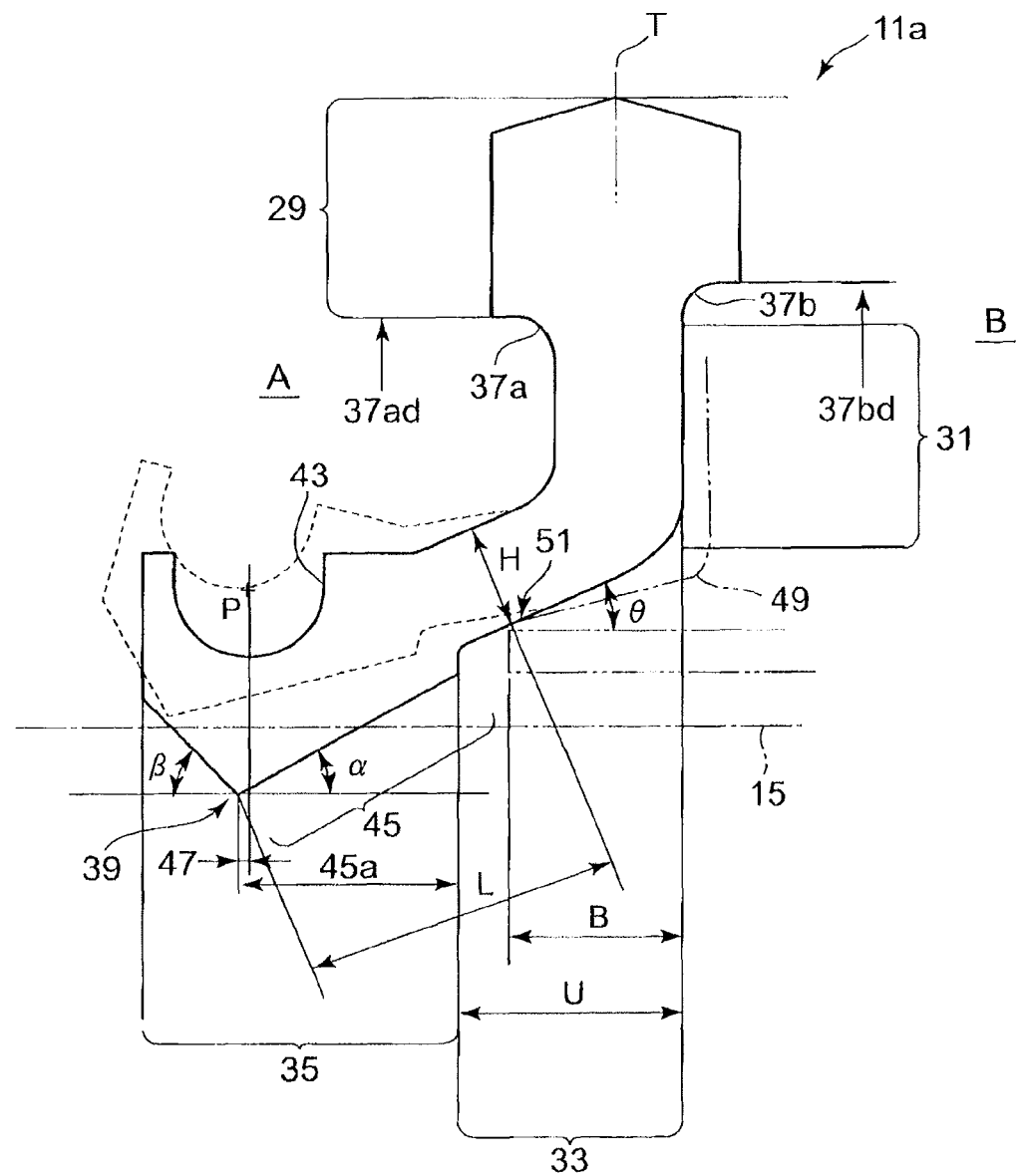
FIG. 2 explains the shape of a single seal ring.

The seal ring 11 forms an annular (ringed) shape; the liner 15 is inserted in the middle hollow space of the seal ring. The cross-section of the annular ring forms a fixed profile (shape) in any radial direction cut plane passing the axis of the shaft; and, FIG. 2 shows the cross-section profile of the seal ring in a case where the cut plane includes the center axis of the propeller shaft.

Hereby, the explanation is given with regard to the first seal ring 11a; the cross-section profile of the second seal ring 11b or the third seal ring 11c is the same as that of the first seal ring 11a; and, the same explanation can be given. As shown in FIG. 2, the seal ring 11a is configured with:

a key part 29 that is fitted in an annular groove 27 (cf. FIG. 3) formed on the inner periphery surface of the casing 9 (comprising a plurality of casing members) casing which is fixed to the outboard side of the ship stern tube 7 so as to surrounds the propeller shaft 5, a heel part 31 that is extended from the key part 29 toward the center axis of the propeller shaft 5 in the radial direction, an arm part 33 that is extended from an inner end part (a tip end part) of the heel part 31 toward the front surface side of the seal ring, with a predetermined taper angle, and a lip part 35 that is formed at a front end part of the arm part 33 and keeps tight contact with the outer periphery surface of the liner 15.

Further detailed explanation will be continued as follows.
(Regarding the Key Part)

The apex part of the key part 29 is formed so that the cross-section profile regarding the apex part forms a reversed V-shape toward the outside in the radial direction; thereby, the summit T of the reversed V-shape is in a plane that equally divides the width (in the longitudinal direction along the propeller shaft) of the key part. Further, the pitch of the left side of the reversed V-shape roof and the pitch of the right side of the reversed V-shape roof are equally tapered; and, the taper angle is, for example, approximately 15 degrees. With the symmetry of the reversed V-shape, in thrusting the key part 29 into the annular groove 27 in the casing 9, the key part made of rubber is compressed so that the apex part deforms toward left and right; namely, thanks to the squeezing space in which the key part can be squeezed toward both the directions, centering of the key part 29 in the annular groove 27 can be automatically performed. In this way, the fitting condition regarding the key part 29 can be made stable.

In the transition area from the key part 29 to the heel part 31, a step part 37a on the front surface side A of the key part 29 and a step part 37b on the back surface side B of the key part 29 are provided so that the width of the seal ring along the propeller shaft direction becomes thinner; in addition, the step parts 37a and 37b are configured with a rounded corner shape.

Further, the inner diameter of the step part 37a on the front surface side is greater than the inner diameter of the step part 37b on the back surface side; and, the height (regarding the side wall of) of the key part 29 on the front side A is higher than the height of the key part 29 on the back side B. More in detail, the height of the key part 29 on the front side A is 7 to 11 mm, while the height of the key part 29 on the back side B is 5.5 to 11 mm; in other words, the radius 37 bd regarding the inner periphery of the step 37b on the back side B is greater than the radius 37 ad regarding the inner periphery of the step 37a on the front side A, by 1.5 to 4 mm.

Figure 3:
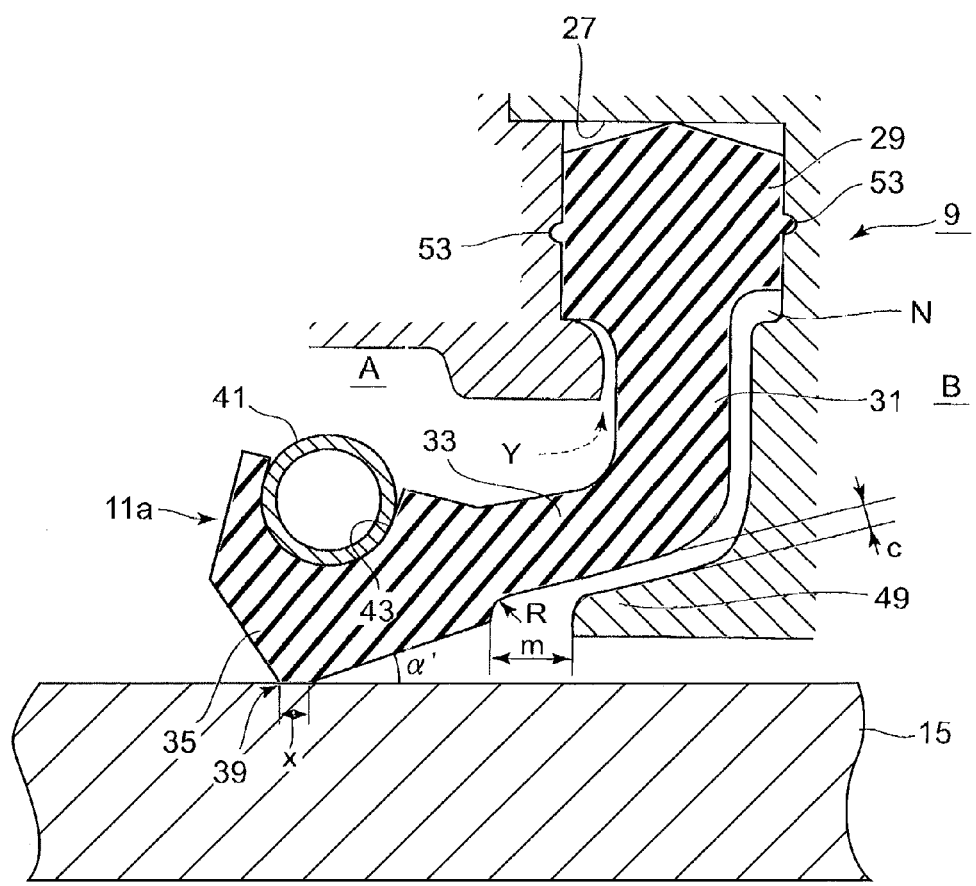
FIG. 3 shows a whole configuration explaining a state where an outer periphery seal-part of the seal ring is fitted in the annular groove of the casing.

In this way, the height of the key part 29 on the back side is established as a 70-to-80% length of the height of the key part 29 on the front side; thus, in fitting the key part 29 into the annular groove 27 in the casing 9 (along the Y-arrow direction (of a broken line) in FIG. 3), because of the lower height of the key part 29 on the back side, the step part 37b on the back side can be easily fitted into the annular groove 27; and, the installation of the seal ring can be simple and sure, without gripping (regarding the seal ring or the key part). The relation (or difference) between the front side height and the back side height is experimentally established so that easiness in fitting and stableness after installation can be achieved.

In other words, when the back side height is excessively lower, the contact area of the key part 29 on the back surface side where the key part is pressed becomes smaller; accordingly, the installation position regarding the key part can be unstable. Hence, it becomes necessary to establish the difference between the front side height and the back side height, in a prescribed range as described above.

Further, the key part 29 is prevented from failing to be smoothly fitted into the annular groove, from being gripped and deforming, and from causing deformation of the contact surface on the side of the lip part 35. In this way, the possibility that the sealing performance is hindered due to the change of the contact stress (pressure) of the lip part 35 can be evaded.

Further, thanks to the lower height of the key part 29 on the back side, the seal ring 11a can be easily thrust into the annular groove 27 in the casing 9; thereby, the seal ring installation is performed from the front side. Accordingly, for instance, when a ship is put into a dock, the seal ring 11a can be replaced by new one, without pulling out the propeller shaft 5, under the condition that the propeller 3 and the liner 15 are dismantled.

(Regarding the Arm Part)

The arm part 33 is formed so that the arm part is extended from an end part (a tip end part) of the heel part 31 toward the front surface side A, with a predetermined taper angle θ. The taper angle θ is established in a range 25 to 30 degrees. The lip part 35 is formed at a front end part of the arm part 33 and keeps tight contact with the outer periphery surface of the liner 15.

Further, up to apart way of the arm part 33, the seal ring 11a is arranged in the casing 9; when seawater pressure works on the seal ring from the front side (i.e. the outboard side), the seal ring is thrust onto a back-up member 49b so that the back-up member keeps contact with and supports the seal ring, outward in the radial direction.

(Regarding the Lip Part)

The lip tip 39 of the lip part 35 forms a V-shape protruding inward in the radial direction. Further, in the lip part 35, a spring groove 43 having a semicircular cross-section is formed; in the spring groove 43, a ringed spring 41 (cf. FIG. 3) is fitted so that the ringed spring thrust the lip tip 39 of the lip part 35 onto the liner 15; thereby, the center P regarding the spring groove 43 is arranged so as to be nearer to the inboard side than the position of the lip tip 39 by an offset 47 in the propeller shaft axis direction, the offset being within approximately 10% of the length 45a (in the propeller shaft axis direction) which is the orthogonal projection length (projected onto the propeller shaft axis direction) of the lip back width 45. More concretely, the orthogonal projection length (i.e. the length 45a) of the lip back width 45 in the propeller shaft axis direction is 8 to 12 mm, while the offset is established within a range of 0.3 to 1.0 mm (3 to 9%).

As described above, when the seal ring 11a is placed in a free condition (where the seal ring 11a is not installed in the casing 9), the position (in the propeller shaft axis direction) of the center P regarding the spring groove 43 is arranged so as to be nearer to the lip back side, by an offset 47; thereby, the offset 47 is established within approximately 10% of the length 45a (in the propeller shaft axis direction) which is the orthogonal projection length (projected onto the propeller shaft axis direction) of the lip back width 45. In the next place, when the key part 29 is fitted in the annular groove 27 in the casing 9 and the lip part 35 keeps tight contact with the outer periphery of the liner 15, the offset amount is established in a range 1.5 to 2.0; thereby, the position (in the propeller shaft axis direction) of the center P regarding the spring groove 43 is arranged so as to be nearer to the lip back side than the position (in the propeller shaft axis direction) of the lip tip 39, by an offset 47; namely, the orthogonal projection length (i.e. the length 45a) of the lip back width 45 in the propeller shaft axis direction is 8 to 12 mm, while the offset is established within a range of 1.5 to 2.5 mm (19 to 21%).

Accordingly, the ratio of the offset to the reference length (i.e. the length 45a) in the free condition stays within approximately 10%, while the ratio of the offset to the reference length in the installation condition is approximately 20%.

Accordingly, under the condition where the seal ring 11a is arranged on the outer periphery of the liner 15, the ringed spring 41 is placed, in the propeller shaft axis direction, so that the center point C is nearer to the lip back side than the lip tip 39, by the offset of the approximately 20% (in the ratio). Thus, the contact stress in the lip part along the lip back side face distributes so that a peaky stress appears around the lip tip 39. In this way, with the enhanced stress around the lip tip 39, the flat contact on the lip back side can be hard to appear; thus, the abnormal wear can be prevented from occurring.

Hence, the contact stress in the lip seal-part can be appropriately maintained so that the leakage or the early abnormal wear is not caused; thus, durability can be enhanced without spoiling sealing performance.

Further, the lip tip 39 of the lip part 35 forms the V-shape protruding inward in the radial direction. Hereby, a lip front face angle β means a taper angle that the lip front face forms with the propeller shaft axis direction, under the free condition; a lip back face angle α means a taper angle that the lip back face forms with the propeller shaft axis direction, under the free condition. The angles α and β are established so that β>α, β=45 to 55 (in degree) and α=25 to 30 (in degree).

As described above, the lip front face angle β is set so that the angle β is greater than the lip back face angle α; the reason of this setting is that the lip part 35 crushes toward the lip back side and the liner sliding (and contacting) surface is formed on the lip back side, when the seawater pressure works on the seal ring 11a after the seal ring is fitted.

Further, when both of the angles α and β exceed the upper limit of the each established range, the cross-angle (i.e. V-angle) regarding the lip front face angle β and the lip back face angle α at the lip tip 39 forms a sharp angle; then, the contacting surface width around the lip tip 39 becomes in shortage in a case of the ships in which vibration levels are high. Thus, the seawater leakage from the front surface side A (cf. FIGS. 2 and 3) to the back surface side B (cf. FIGS. 2 and 3) as well as the lubricating oil leakage from the back surface side B to the front surface side A is inclined to occur.

On the contrary, when both of the angles α and β fall short of the lower limit of the each established range, the cross-angle of the lip front face angle β and the lip back face angle α at the lip tip 39 forms an obtuse (not-sharp) angle; then, the contacting surface width around the lip tip 39 becomes greater, and satisfactory contact pressure cannot be achieved because of the excessive contact area; accordingly, sealing performance is deteriorated and early abnormal wear is inclined to occur.

More concretely, as shown in the first embodiment of FIG. 4, confirmation test results reveal that no leakage from the back face side to the front face side as well as no abnormal wear of the sliding surface can be found, when 45°≦β≦55° and 25°≦α≦30° under the free condition as well as under a later-described test condition (a condition where the pressure on the front face side is higher than the pressure on the back face side, by 0.15 MPa) regarding the performance test.

As the comparison example 1 (in the table of FIG. 4) shows, when the condition 25°≦α≦30° in the first embodiment is replaced by a condition 20°≦α≦25° (namely, the angle α is reduced), the contacting surface width around the lip tip 39 becomes greater and abnormal wear is caused.

As the comparison example 2 (in the table of FIG. 4) shows, when the condition 45°≦β≦55° in the first embodiment is replaced by a condition 55°≦β≦65° (namely, the angle α is increased), the cross-angle (i.e. V-angle) at the lip tip 39 becomes sharper and the contacting surface width around the lip tip 39 becomes smaller; thus, the leakage from the back face side to the front face side is increased.

As the comparison example 3 (in the table of FIG. 4) shows, under the conditions 20°≦α≦25° (namely, the angle α is reduced) and 55°≦β≦65° (namely, the angle β is increased), leakage from the back face side to the front face side as well as abnormal wear is inclined to occur.

Consequently, it is concluded that establishing the angle α and the angle β in each appropriate range can constrain potential abnormality that may appears on the contacting surface in the neighborhood of the lip tip 39; thus, durability can be enhanced without spoiling sealing performance. Establishing the lip back face angle α and the lip front face angle β as described, in particular, together with establishing the offset 47 regarding the position of the ringed spring 41 (or the center point P thereof) in an appropriate range can make the contacting stress in the neighborhood of the lip tip 39 appropriate, and prevent the abnormal wear from occurring.

Further, as shown in FIGS. 2 and 3, along the back side face of the heel part 31, as well as, along and parallel to the slope direction of the taper angle θ regarding the arm part 33, a back-up member 49 that is a part of the casing 9 is formed; the back-up member 49 supports the seal ring from below upward (from inside toward outside in a radial direction). The arm thickness H is hereby defined as the thickness of the arm part at a contacting position 51 regarding the arm part 33 and the back-up member 49; incidentally, the contacting point 51 is, in more detail, an intersection point at which the slope of the back-up member and the slope of the rounded part (R-part in FIG. 3) of the front end side of the arm part 33 intersect each other. Further, an arm length L is defined as a length along the taper angle direction from the contacting point 51 to the lip tip 39. The arm thickness H and the arm length L are established so that a relation $H^3/L^4 = (10 \text{ to } 30) \times 10^{-4}$ (in mm$^{-1}$) holds.

In other words, as shown in FIG. 2, a part of the seal ring on the front side from the contacting point 51 forms a cantilever beam for which the cantilever deflection formula can be used; thereby, as described above, the contacting point 51 is the intersection point at which the slope of the back-up member and the slope of the rounded part (R-part in FIG. 3) of the front end side of the arm part 33 intersect each other.

Accordingly, the bending deflection V regarding the lip tip 39 is computed by use of the following formula (1). An appropriate stiffness of the arm part 33 and the lip part 35 are evaluated with regard to the parameter $H^3/L^4$ that appears in the formula (1); hereby, the appropriate stiffness of the arm part 33 and the lip part 35 means a stiffness level at which the lip tip 39 keeps contact with the liner with an appropriate contact stress in the seal ring.

The formula (1) is expressed as follows.

$$V = K_1 (W L^4 / E I) = K_2 (W L^4 / E H^3) \quad (1),$$

where W is the pressure that works on the front face side of the seal ring, $K_1$ and $K_2$ are constants, and E is Young' modulus (regarding the used material such as fluororubber).

Based on the results of the tests, the relation $H^3/L^4 = (10 \text{ to } 30) \times 10^{-4}$ (in mm$^{-1}$) is found. In other words, it is found that, so long as the length L and the height H is within a range (or a domain) that the formula (1) allows, an appropriate contacting state is maintained so that excessively wide contact (excessively flat contact) regarding the sliding surface of the lip seal part can be evaded, and neither leakage nor abnormal wear can be caused; thus, it is found that durability can be enhanced without spoiling sealing performance.

Further, it is preferable to establish the stiffness of the arm part 33 and the lip part 35, differently from the approach where the parameter $H^3/L^4$ is used, so that the contacting surface width in the neighborhood of the lip tip becomes 2 to 3 mm when the difference between the pressure on the front face side and the pressure on the back face side is arranged to be 0.15 MPa, under a condition that the seal ring 11a is set in the casing 9 and the liner 15 is installed.

In this way, by establishing the contacting surface width, an appropriate contacting state is maintained so that excessively wide contact (excessively flat contact) regarding the sliding surface of the lip part 35 can be evaded, and neither leakage nor abnormal wear can be caused; thus, durability can be enhanced without spoiling sealing performance.

In other words, an appropriate contact stress can be achieved by establishing the stiffness of the arm part 33 and the lip part 35 according to either the approach where the relation $H^3/L^4 = (10 \text{ to } 30) \times 10^{-4}$ (in mm$^{-1}$) is satisfied, or the approach where the contacting surface width in the neighborhood of the lip tip is within a predetermined range under a predetermined condition.

In addition, the position of the front edge of the back-up member 49 or the length B (cf. FIG. 2) regarding the back-up member 49 is established so that a relation (B/(U+H)=60 to 71%) holds, where U and H are a length and the thickness regarding the arm part 33.

Thus, in addition to establishing the stiffness by the approach where the feasible range regarding the parameter $H^3/L^4$ is determined, the stiffness of the arm part 33 can be further appropriately determined and maintained, by establishing the allowably existing range regarding the front edge of the back-up member 49.

(Regarding the Fitting of the Seal Ring into the Casing)

As shown in FIG. 3, the key part 29 is fitted in the annular groove of the casing 9; in the seal ring fitting condition where the lip part 35 keeps tight contact with the outer periphery of the liner 15, a gap space having a gap c is formed between the arm part 33 and the back-up member 49, both the side surfaces of the gap space being substantially parallel with each other; further, a gap space having a gap m is formed between the front edge of the back-up member 49 and the R-part of the seal ring regarding the transition part from the arm part 33 to the lip part 35. Hereby, as shown in FIG. 3, the lip back face angle is expressed as an angle α'.

When seawater pressure works on the front surface side of the seal ring, 11a, the lip part 35 and the arm part 33 bend, and come in contact with the front edge of the back-up member 49; the arm part 33 and the lip part 35 that are placed on the front side of the contact position 51 further deform after the lip part 35 and the arm part 33 come in contact with each other.

Side walls of the annular groove 27 are formed on the front side and the back side; the height of the front side wall is the same as that of the back side wall. When the key part is fitted in the annular groove, a space N is formed inside of the step part 37b that is formed at the transition part from the key part 29 to the heel part 31; thanks to the space N, the fitting of the key part 29 in the annular groove can be easily and surely performed, as is already explained.

In addition, near to each middle position in the radial direction on both the sides of the annular groove 27 in which the key part 29 is fitted, a relief groove 53 is formed. Thanks to the relief grooves on both the sides, when the key part 29 is thrust and fitted in the annular groove 27 in the casing 9, a part of each side wall of the key part enters the relief groove 53; thus, the relief grooves 53 play role of positioning/fixing function regarding the key part so that the movement of the key part 29 toward the inner side is restrained after the key part 29 is thrust and fitted in the annular groove 27. In this way, the position of the key part 29 in the casing 9 is locked under the fitted condition; and, stable positioning is achieved.

Further, the ringed spring 41 is fitted in the spring groove 43 formed in the lip part 35, so that the fitting condition is not too loose before the liner 15 is inserted and the spring function is effective after the liner 15 is inserted. Hence, with reference to the explanation regarding the offset of the lip part 35 (i.e. as explained in the description regarding the lip part), the relative positioning regarding the center P of the spring groove 43 and the lip tip 39 is determined so that the ratio of the offset to the reference length (i.e. the length 45a) in the free condition stays within approximately 10%, while the ratio of the offset to the reference length in the installation condition is approximately 20%; hereby, the reference length (i.e. the length 45a) means the orthogonal projection length (projected onto the propeller shaft axis direction) of the lip back width 45.

(Regarding the Performance Test Results)

In the next place, with reference to FIGS. 5(a) and 5(b), the results of the performance confirmation tests regarding the seal ring 11a are now explained.

The confirmation tests are performed under the condition where the seal ring is fitted in the casing 9 and the liner 15 is installed and under the test conditions as described in FIG. 5(b). In the test conditions, the rotation speed of the liner is 3.8 m/s at the outer periphery of the liner 15; the working pressure on the front face side A is higher than that on the back face side B, by 0.15 MPa; the front face side space is filled with fresh water and the back face side space is filled with oil. In each test, the amount of leakage from the front face side to the back face side, the contact width of the sliding/contacting surface, the wear condition of the sliding/contacting surface and the deformation of the lip part are investigated. In addition, the seal ring used for the tests is of a #600 type that is applied to the liner which trunk part outer-periphery diameter is 600 mm, and the length 45a that is the projected length of the lip back width 45 onto the propeller shaft axis direction is 9 mm.

As shown in FIG. 5(a), the first embodiment 1 is a case where the offset 47 regarding the ringed spring 41 is 0.5 mm under a condition that the back-up member 49 is provided. In addition, in relation to the contacting position 51 of the back-up member 49, the scale m (cf. FIG. 3) is set as approximately 4 mm, while the length in the shaft axial direction regarding the arm part 33 is approximately 11 mm.

In the second embodiment, the offset 47 regarding the ringed spring 41 is 1.0 mm; and, other items in the second embodiment are the same as the corresponding items in the first embodiment.

Further, in the comparison example 4, the back-up member 49 is omitted: apart from this omission, the setting conditions are the same as the corresponding conditions in the second embodiment. In the comparison example 5, the offset 47 regarding the ringed spring 41 is 2.0 mm; and, the back-up member 49 is provided. In the comparison example 6, the setting conditions are the same as the corresponding conditions in the example 5 except that the back-up member 49 is omitted.

According to the first embodiment as well as the second embodiment, neither leakage nor abnormal wear is found; further, it is confirmed that there is little deformation of the lip part 35. Moreover, it is confirmed that the contacting surface width of 2 to 3 mm is appropriate in the first embodiment as well as the second embodiment.

Figure 6:
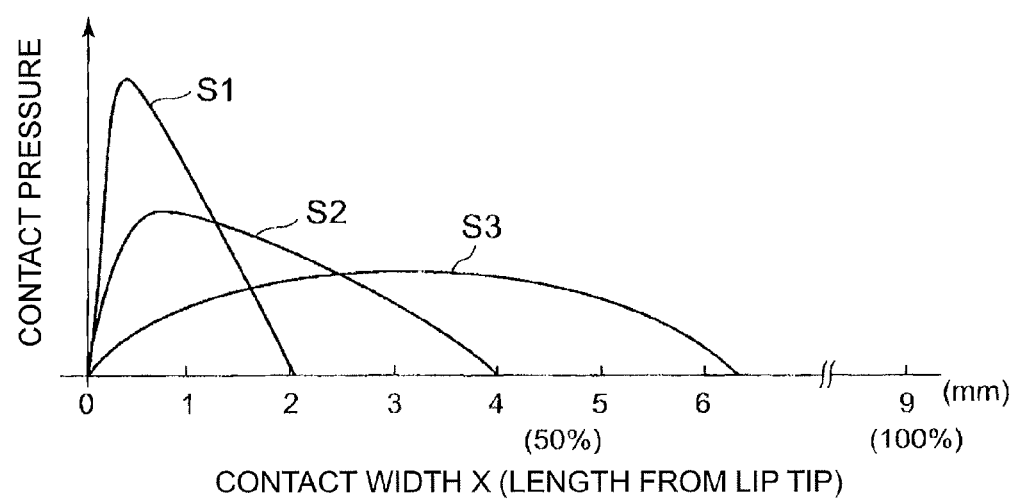
FIG. 6 shows the change of contact pressure distributions in response to the off-set arrangements in relation to the ringed spring locations.
Figure 7:
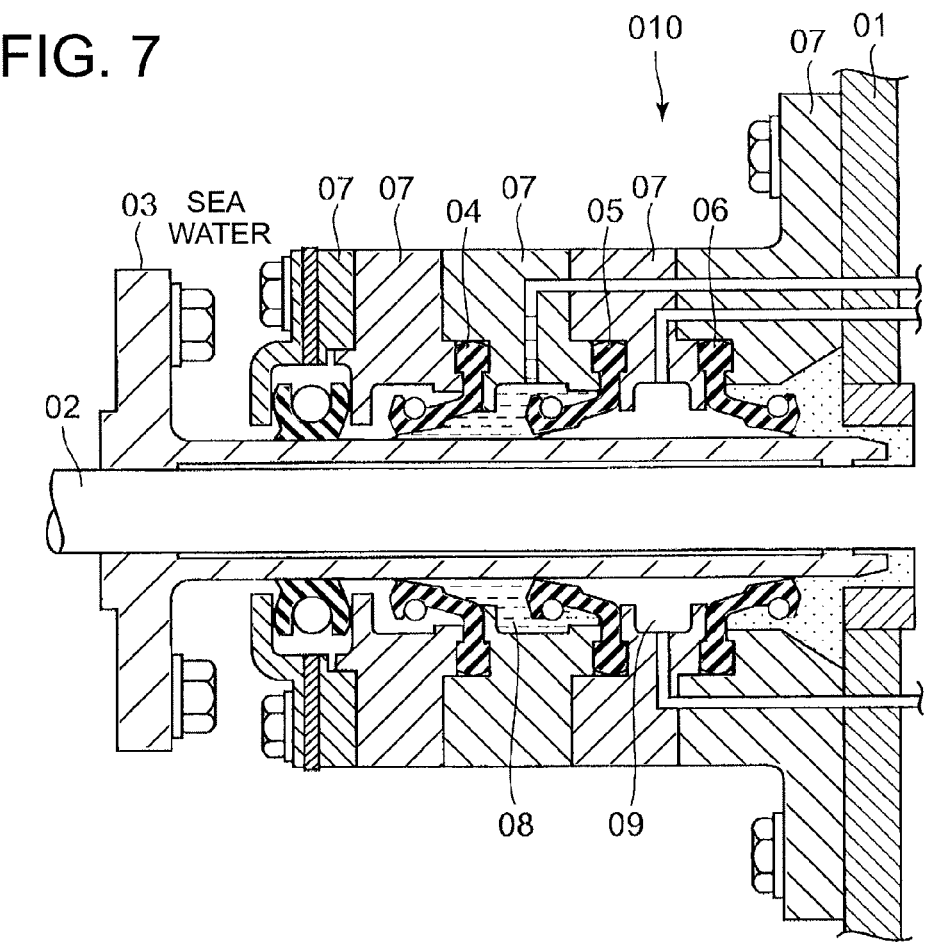
FIGS. 7 and 8 explains a conventional technology.
Figure 8:
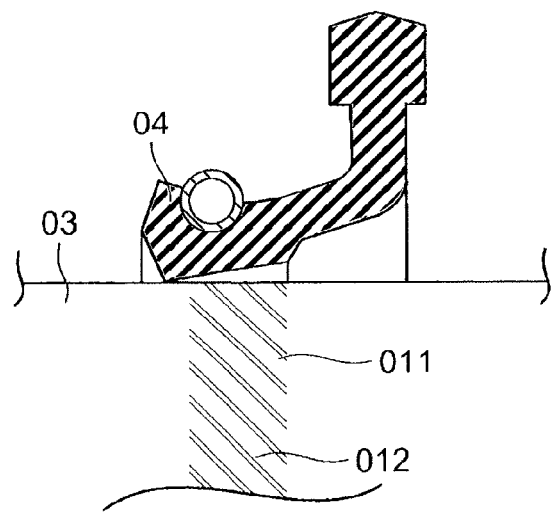

In relation to this contacting surface width X (the contacting length in the shaft direction as shown in FIG. 3), the contact pressure distributions (distribution patterns) with regard to the contacting surface width X as a lateral axis parameter are depicted in FIG. 6.

As is shown with the first embodiment, in a case where the offset 47 regarding the ringed spring 41 is 0.5 mm that is smaller than 10% of the orthogonal projection length (projected onto the propeller shaft axis direction) of the lip back width, the contacting surface width X is 2 mm; thereby, as shown by the curve S1 in FIG. 6, the contact pressure distribution becomes peaky in the neighborhood of the lip tip; thus, sealing performance can be enhanced.

As is shown with the comparison example 5, in a case where the offset 47 regarding the ringed spring 41 is 2.0 mm that exceeds 10% of the orthogonal projection length (in the propeller shaft axis direction), the contacting surface width X is 4 mm; thereby, as shown by the curve S2 in FIG. 6, the contact pressure in the neighborhood of the lip tip is weakened; thus, sealing performance is deteriorated, and there happens an apprehension that the contact pressure distribution seems to become flat and abnormal wear in an early stage may be caused.

Further, as is shown with the comparison example 6, in a case where the back-up member 49 is not provided, the stiffness of the arm part 33 is reduced and the contacting surface width reaches 6.5 mm; thereby, as shown by the curve S3 in FIG. 6, the weakened contact pressure distributes in a wide range; thus, the sealing performance is deteriorated, and there happens an apprehension that the contact pressure distribution seems to become flat (and wide) and abnormal wear in an early stage may be caused.

Further, in the comparison example 4, the result simply due to the difference between the case (i.e. the comparison example 4) without the back-up member and the case (i.e. the second embodiment) with the back-up member is revealed. In the second embodiment where the back-up member 49 is provided, the parameter $H^3/L^4$ equals to $14 \times 10^{-4}$ (in $mm^{-1}$); on the other hand, in the comparison example 4 where the back-up member 49 is not provided, the parameter $H^3/L^4$ becomes $4.6 \times 10^{-4}$ (in $mm^{-1}$). In this way, when the back-up member 49 is omitted, the length L becomes longer, and the parameter $H^3/L^4$ becomes smaller than $10 \times 10^{-4}$ (in $mm^{-1}$), the contact pressure in the is weakened; and the weakened contact pressure distributes in a wide range; thus, the sealing performance is deteriorated, and there happens an apprehension that the contact pressure distribution seems to become flat and abnormal wear in an early stage may be caused.

Further, when the parameter $H^3/L^4$ becomes greater than $30 \times 10^{-4}$ (in $mm^{-1}$), the bending deformation becomes smaller; accordingly, the tracking performance of the seal ring against the shaft vibrations is deteriorated. Further, it becomes necessary that the liner surface is sometimes grinded in order to amend the worn or damaged surface condition; when the liner is grinded in such cases, a loose fit condition appears between the seal ring and the liner; and, if the sealing device is reassembled with the loose fit condition, the leakage of seawater or oil may become more probable during the strong shaft-vibrations due to bad weather.

As is taught by the above-described embodiments, by improving the shape (profile) of configuration elements of the seal ring 11a such as the key part 29 and the annular groove 27 in which the key part 29 is fitted, the fitting performance of the seal ring 11a is enhanced; further, the deformation of the key part 29 is restrained; the deformation of the lip part 35 due to the deformation of the key part 29 is also restrained. As a result, in response to the reduced deformation of the key part 29, the contact stress in the lip part 35 maintained so that reverse effects on the sealing performance can be evaded.

Further, the seal ring 11a can be easily thrust and fitted in the annular groove 27 in the casing 9; and, the replacement regarding the seal rings 11a, 11b and 11c can be performed on the outer periphery of the liner (or the propeller shaft) without pulling-out the propeller shaft 5.

Further, by placing the center P regarding the spring groove 43 nearer to the inboard side than the lip tip 39 (in the propeller shaft axis direction) by an offset that is established within approximately 10% of the length 45a which is the orthogonal projection length of the lip back width 45 onto the propeller shaft axis direction, the key part 29 is fitted in the annular groove 27; further, when the lip part 35 is set on the outer periphery of the liner 15 so as to keep tight contact with the liner 15, the ringed spring 41 is placed at a position nearer to the inboard side than the lip tip 39 (in the propeller shaft axis direction) by an offset that is established within approximately 20% of the orthogonal projection length of the lip back width 45 onto the propeller shaft axis direction. Thus, the contact pressure in the neighborhood of the lip-tip 39 is enhanced and the sealing performance of the lip part 35 can be enhanced. In addition, since the contact pressure (stress) in the neighborhood of the lip tip is enhanced, the flat (and wide) contact on the lip back side can be hard to appear; thus, the abnormal wear can be prevented from occurring.

Further, by establishing the stiffness of the arm part 33 and the lip part so that the relation $H^3/L^4=(10 \text{ to } 30)\times10^{-4}$ (in $mm^{-1}$) holds, or by establishing the contact surface width X in a range from 2 mm to 3 mm under a usual service condition where the pressure on the front face side A is higher than the pressure on the back face side B by a level of 0.15 MPa, the contact pressure in the neighborhood of the lip-tip 39 is enhanced, the sealing performance can be enhanced, the contact stress in the lip part 35 can be appropriately maintained so that neither leakage nor abnormal wear in an early stage appears, and durability can be enhanced without spoiling sealing performance.

Industrial Applicability

According to the present invention, the contact stress or pressure in the lip seal-part can be established in an appropriate condition so that neither leakage nor abnormal wear in an early stage appears, durability can be enhanced without spoiling sealing performance, the fitting performance regarding the outer periphery part of the seal ring fitted in the annular groove in the casing can be enhanced, and the contact stress in the lip seal-part can be made stable. Hence, the present invention can be preferably applied to a seal ring and a stern tube sealing device having the seal ring.

What is claimed is:

1. A seal ring assembly comprising:
a seal ring for sealing between a casing member provided on an outboard side of a stern tube and a ship propulsion shaft that penetrates an inner space of the casing member for preventing seawater from entering an inboard side of the stern tube, the seal ring comprising:
a key part fitted in an annular groove formed in the casing member;
a heel part radially extending inwardly from the key part toward a center axis of the ship propulsion shaft;
an arm part extending at a predetermined incline angle from an inner end part of the heel part toward a front surface side of the seal ring, an inner periphery side of the arm part being supported by a back-up member provided with the casing member;
a lip part extending from a front end part of the arm part, the lip part engaging at a contacting point, with an outer periphery surface of a liner that is fitted around or on an outer periphery surface of the ship propulsion shaft,
wherein the key part has an apex part having an inverted V-shaped cross-sectional profile, with an apex of the inverted V-shaped cross-sectional profile extending radially outwardly so that the apex lies in a plane that equally divides a width of the key part, which extends along an axis direction of the ship propulsion shaft,
wherein the key part has a front step part on the front surface side of the seal ring and a back step part on a back surface side of the seal ring, so that the width of the seal ring becomes thinner in a transition area from the key part toward the heel part,
wherein an inner diameter of the key part at the back step part is greater than an inner diameter of the key part at the front step part, to allow a space to be formed along the radial direction between an inner periphery of the back step part and the casing member,
wherein the lip part has a V-shaped lip tip protruding radially inwardly and a spring groove having a semicircular cross-section configured to receive a ringed spring that allows the lip part to be thrustable radially inwardly toward the ship propulsion shaft,
wherein a center of the spring groove is positioned more inwardly toward the front end part of the arm part than an apex of the V-shaped lip tip, by an offset extending along the ship propulsion shaft axis direction,
wherein the lip part has a lip back face extending from the apex of the V-shaped lip tip toward the front end part of the arm part, and a lip front face extending from the apex of the V-shaped lip tip away from the front end part of the arm part,
wherein the offset is within approximately 10% of an orthogonal projection length of a width of the lip back face, the orthogonal projection being a projection extending axially along the ship propulsion shaft axis direction,
wherein the lip front face has an angle $\beta$, which is an incline angle at which the lip front face forms relative to the ship propulsion shaft axis direction toward the front surface side and the lip back face side has an angle $\alpha$, which is an incline angle relative to the ship propulsion shaft axis direction toward the back surface side, and
wherein the angles $\alpha$ and $\beta$ have following relationships: $\beta>\alpha$, $\beta=45$ to $55°$, and $\alpha=25$ to $30°$.

2. The seal ring assembly according to claim 1, wherein:
the arm part has a thickness H, which is a thickness of the arm part at an arm contacting point where the arm part is configured to contact with the back-up member,
the lip portion and the arm has a length L that extends between the apex of the V-shaped lip tip to the arm contacting point, and
the thickness H and the length L have a following relationship: $H^3/L^4=(10 \text{ to } 30)\times10^{-4}$ (in $mm^{-1}$).

3. The seal ring assembly according to claim 1, wherein the arm part and the lip part have stiffness that allows the lip part to have a contacting surface configured to contact with the outer periphery of the liner and have a width of 2 to 3 mm, when pressure on the front surface side of the seal ring is higher than pressure on the back surface side of the seal ring, by 0.15 MPa, while the key part is seated in the annular groove, the liner is installed and the lip part is in contact with the outer periphery of the liner.

4. A stern tube sealing assembly comprising:
a casing member provided on an outboard side of a stern tube;
a ship propulsion shaft that penetrates an inner space of the casing member;
a liner fitted around or on an outer periphery surface of the ship propulsion shaft; and a seal ring provided between the casing member and the ship propulsion shaft that prevents seawater from entering an inboard side of the stern tube, wherein the casing member has an annular groove and a back-up member, and wherein the seal ring comprising:

a key part fitted in the annular groove of the casing member;

a heel part radially extending inwardly from the key part toward the ship propulsion shaft;

an arm part extending at a predetermined incline angle from an inner end part of the heel part toward a front surface side of the seal ring, an inner periphery side of the arm part being supportable by the back-up member;

a lip part extending from a front end part of the arm part, the lip part engaged, at a contacting point, with an outer periphery surface of the liner, wherein the key part has an apex part having an inverted V-shaped cross-sectional profile, with an apex of the inverted V-shaped cross-sectional profile extending radially outwardly so that the apex lies in a plane that equally divides a width of the key part, which extends along an axis direction of the ship propulsion shaft, wherein the key part has a front step part on the front surface side of the seal ring and a back step part on a back surface side of the seal ring, so that the width of the seal ring becomes thinner in a transition area from the key part toward the heel part, wherein an inner diameter of the key part at the back step part is greater than an inner diameter of the key part at the front step part, so that a space is formed in the radial direction between an inner periphery of the back step part and the casing member, wherein the lip part has a V-shaped lip tip protruding radially inwardly and a spring groove having a semicircular cross-section configured to receive a ringed spring that thrusts the lip part radially inwardly toward the ship propulsion shaft, wherein a center of the spring groove is positioned more inwardly toward the front end part of the arm part than an apex of the V-shaped lip tip, by an offset extending along the ship propulsion shaft axis direction, wherein the lip part has a lip back face extending from the apex of the V-shaped lip tip toward the front end part of the arm part, and a lip front face extending from the apex of the V-shaped lip tip away from the front end part of the arm part, wherein the offset is within approximately 10% of an orthogonal projection length of a width of the lip back face, the orthogonal projection being a projection extending axially along the ship propulsion shaft axis direction, wherein the lip front face has an angle $\beta$, which is an incline angle at which the lip front face forms relative to the ship propulsion shaft axis direction toward the front surface side and the lip back face has an angle $\alpha$, which is an incline angle relative to the ship propulsion shaft axis direction toward the back surface side, and wherein the angles $\alpha$ and $\beta$ have following relationships: $\beta>\alpha$, $\beta=45$ to $55°$, and $\alpha=25$ to $30°$.

5. The stern tube sealing assembly according to claim 4, wherein:

the arm has a thickness H, which is a thickness of the arm part at an arm contacting point where the arm part contacts with the back-up member, the lip portion and the arm has a length L that extends between the apex of the V-shaped lip tip to the arm contacting point, and the thickness H and the length L have a following relationship: $H^3/L^4=(10$ to $30)\times 10^{-4}$ (in $mm^{-1}$).

6. The stern tube sealing assembly according to claim 4, wherein the arm part and the lip part have stiffness that allows the lip part to have a contacting surface configured to contact with the outer periphery of the liner and have a width of 2 to 3 mm, when pressure on the front surface side of the seal ring is higher than pressure on the back surface side of the seal ring, by 0.15 MPa, while the key part is seated in the annular groove, the liner is installed and the lip part is in contact with the outer periphery of the liner.

7. The stern tube sealing assembly according to claim 4, wherein the annular groove has opposing walls each with a relief groove near a middle position of the respective wall along the radial direction.

* * * * *